UNITED STATES PATENT OFFICE.

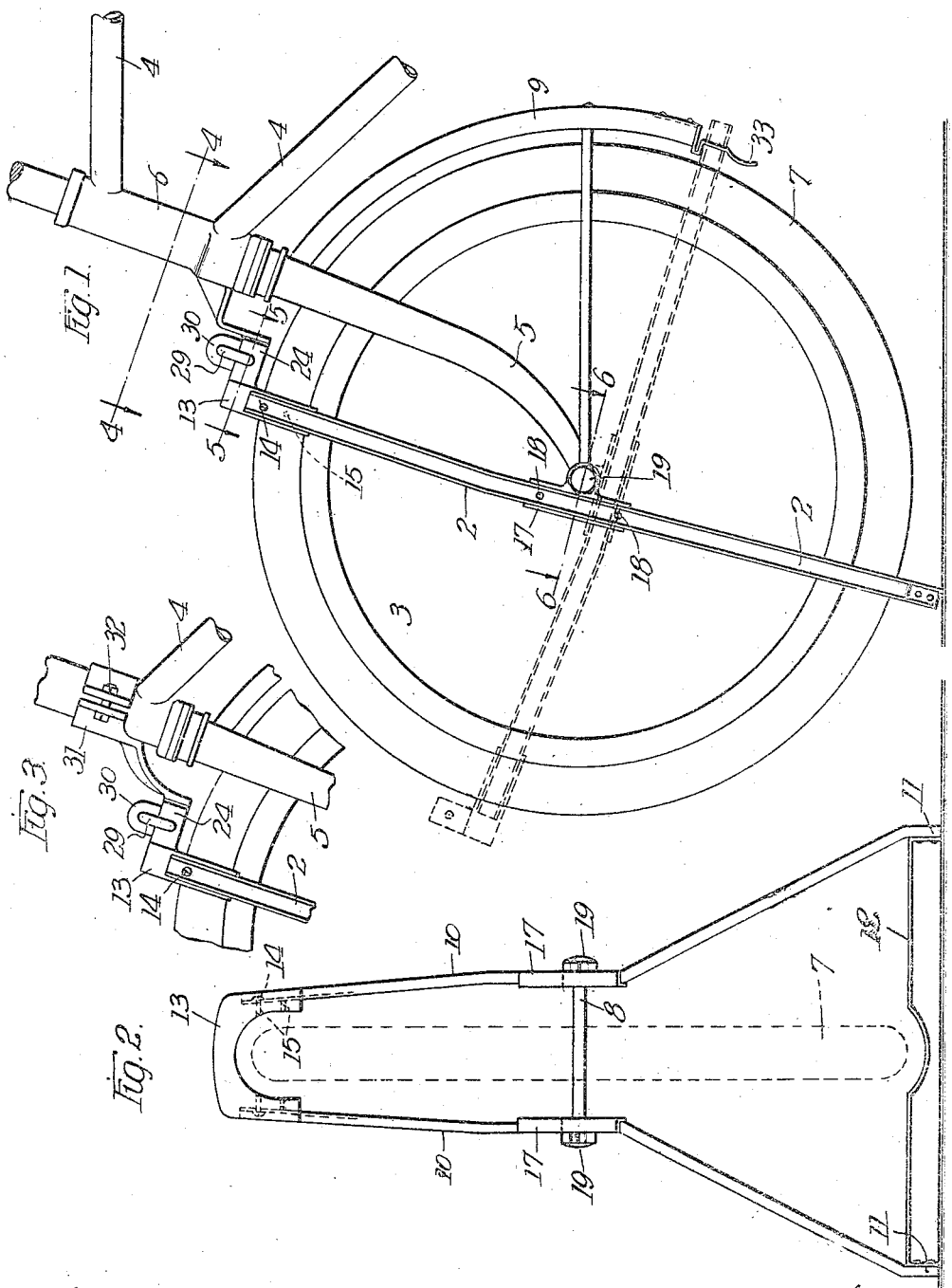

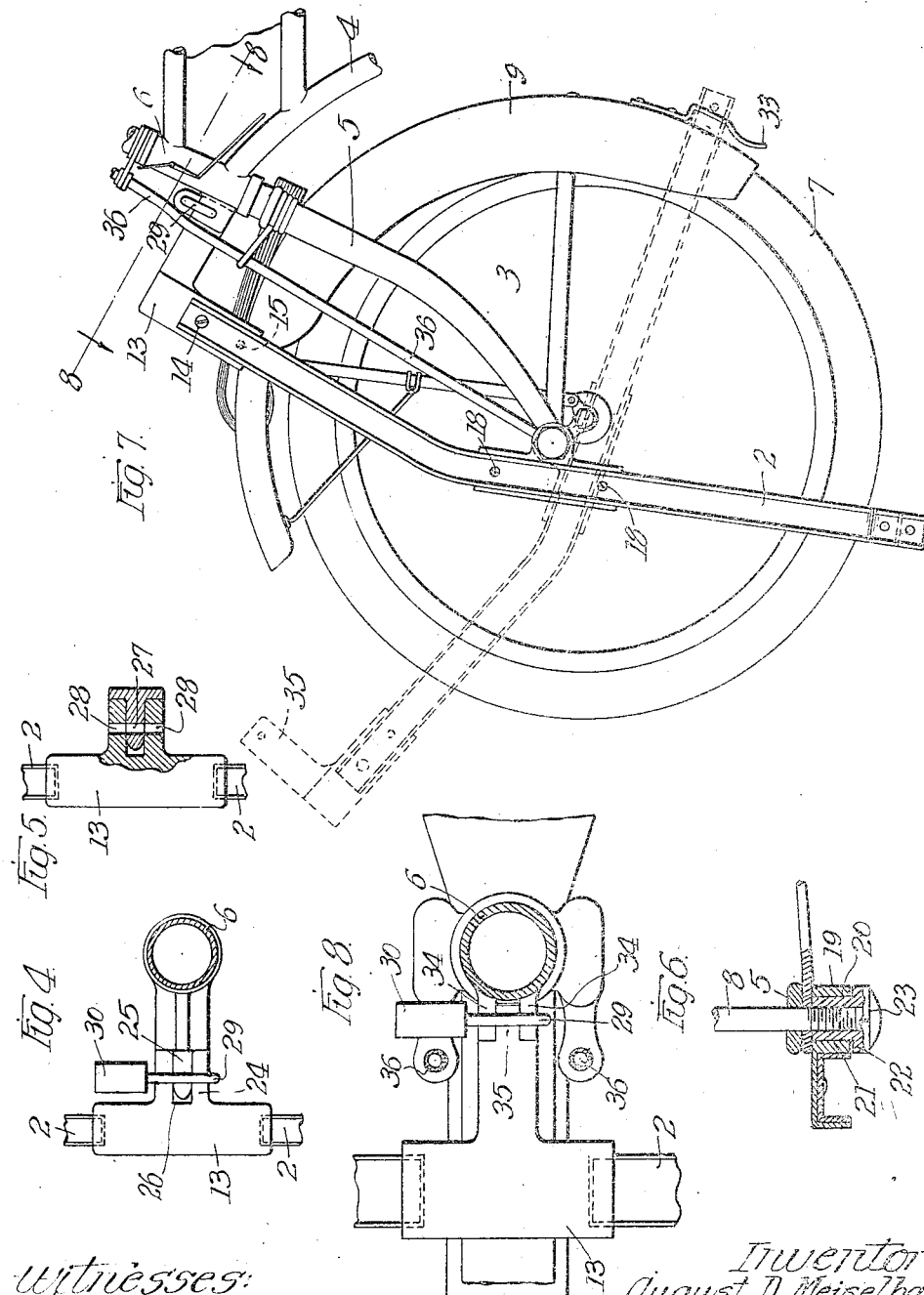

AUGUST D. MEISELBACH, OF CHICAGO, ILLINOIS.

VEHICLE-SUPPORT.

1,252,135.

Specification of Letters Patent.   Patented Jan. 1, 1918.

Application filed September 27, 1915.   Serial No. 52,769.

*To all whom it may concern:*

Be it known that I, AUGUST D. MEISELBACH, a citizen of the United States, and a resident of Chicago, Cook county, Illinois, have invented certain new and useful Improvement in Vehicle-Supports, of which the following is a specification.

My invention relates to improvements in supports or stands for vehicles and has particular reference to supports for two wheeled vehicles or bicycles.

The object of my invention is to provide a support which shall be adapted for application to the forward or steering wheel of such vehicle; to provide a support which shall be adapted to be carried by the forward or steering frame or fork of the vehicle and which shall be so arranged that the support will automatically move from its supporting position to its carrying position upon the forward movement of the vehicle from a state of rest. A further object of my invention is to provide a support which is adapted to be carried upon and by the forward or steering part of the vehicle such as the steering fork and which shall be adapted to interlock with a stationary part of the vehicle frame such as the steering head to retain the steering wheel and its carrying frame against movement relatively to the main frame while the vehicle is being supported; to provide a support adapted to be pivotally mounted upon the steering frame or fork of the vehicle and so arranged that when it is in a supporting position the vehicle shall rest upon two transversely spaced points or feet slightly in advance of the center of the steering wheel and upon the rear wheel, thus supporting the vehicle with great stability, and adapted to interlock with a stationary part of the vehicle frame to hold said two supporting points stationary relatively to the rear wheel.

My invention comprises a supporting frame or member adapted to be pivotally mounted upon the steering frame or fork of the vehicle and to span the steering wheel and provided at its lower end with two supporting points, one at either side of the steering wheel, and at its upper end with a member adapted to interlock with a coöperative part carried by the main frame of the vehicle whereby when the support is in a supporting position, the steering wheel and its frame or fork is held against steering movement.

My invention also consists in a support for two wheeled vehicles such as bicycles and motorcycles, the support being adapted to be pivotally mounted adjacent to the center of the forward wheel and of a length to span the wheel, provided on one end with widely separated feet and at the other end with a part adapted to interlock with a coöperative part secured to the main frame of the vehicle when the support is in supporting position, the upper part of the supporting frame being heavier than the lower part and adapted, as the support is freed from its supporting position to over-balance the lower part and raise it out of contact with the ground, and a spring tongue attached to the steering wheel frame adapted to engage the lower part of the supporting frame, as it is raised from the ground, and hold it in such a position.

My invention also consists in the several combinations and arrangements of devices and parts and in the features of construction whereby I am enabled to attain the above and other objects and all as hereinafter described and particularly pointed out in the appended claims.

My invention will be more readily understood by reference to the accompanying drawings forming part of this specification and in which:—

Figure —1— is a side elevation of the forward part of a bicycle equipped with a support embodying my invention, Fig. —2— is a front elevation of the support, the front wheel indicated in dotted lines, Fig. —3— is a detail view showing a removable locking part for attachment to the head of the vehicle, Fig. —4— is a detail plan section on the line 4—4 of Fig. —1—, Fig. —5— is a detail plan section on the line 5—5 of Fig. —1—, Fig. —6— is a detail horizontal section on the line 6—6 of Fig. —1—, Fig. —7— is a view similar to Fig. —1— showing the forward part of a motorcycle equipped with a spring mounted front wheel and with a support embodying my invention, and Fig. —8— is an enlarged detail plan section on the line 8—8 of Fig. —7—.

My improvement consists in providing a support of a length to span diametrically across the steering wheel and pivotally mounted to swing substantially concentric with the wheel, one end of said support being adapted to rest on the ground and lift the wheel free of the ground, and at the same time the opposite end is adapted to interlock with a part rigid with the frame of the vehicle and lock the front wheel and its carrying frame against movement relatively to the main frame. The part rigid with the main frame may be integral therewith or adapted to be clamped thereon, the essential feature being that when it is in place it forms a rigid part for interlockment with a part of the support to hold the steering wheel and its frame against relative movement when the support is in supporting position. The frame of the support which spans the steering wheel is pivotally mounted upon the frame which carries the steering wheel and, as illustrated in the drawings, this may be the wheel axle itself, or it may be some convenient point of support near the axle, preferably the point of support is fixed relatively to the steering wheel frame though obviously this is not an absolute necessity.

While the automatic raising of the support is of value when the support is used upon a bicycle it is of even greater value when the device is used upon a motorcycle for by throwing in his clutch, when the engine is running, the rider can force the vehicle forward and free the front part thereof from the support, when the support will automatically lift itself clear of the ground and secure itself in a non-supporting position. Another important feature resides in the convenience with which a lock can be applied to the vehicle, the support and the vehicle having coöperating parts provided with holes which register when the stand is in a supporting position, and which are adapted to receive the bail or tongue of a lock. It is thus, only necessary to provide these registering openings in the interlocking parts to arrange my improvement for the positive and secure locking of the vehicle against theft by one who wishes to ride or roll the vehicle away.

In said drawings, 2 is a stand or support, 3 illustrates the forward part of a vehicle having a main frame 4 and a steering fork or frame 5 mounted for oscillatory steering motion on the head 6 and carrying at its lower end the front wheel 7. The wheel is mounted for rotation in the usual manner on the front axle 8 and the steering wheel is also equipped with a guard 9 which extends substantially concentric with the wheel and over the rear upper part thereof. My stand or support consists of a frame as shown approximately rectangular in shape and of a length to diametrically span the wheel and which is adapted to be pivotally mounted substantially concentric with the wheel. It consists of light channel-shaped side bars 10 connected at their lower ends by a light cross or bridge member 12 and at their upper ends by a relatively heavy yoke 13. The lower ends 11 of the side bars 10 extend substantially parallel with each other and form transversely spaced feet. The connecting end pieces are adapted to swing around the wheel free of its periphery. I mount this frame upon a centrally located point to permit the swinging action described, and I mount it at some convenient point at or near the center of the wheel. In the case of a bicycle this convenient point is naturally the wheel axle 8 itself, but in the case of a motorcycle it may be and is more often a point near or close to the wheel center. Preferably the pivot upon which the support is mounted is rigid with the steering wheel frame so that the several parts of the support, in its different positions, will properly register with the several fixed points on the vehicle with which the support coöperates for various purposes. As stated, in Figs. —1— and —2— the support is pivotally mounted on the wheel axle 8 which axle is fixed relatively to the steering wheel frame, being carried in the lower ends of the fork 5. In Fig. —7— the support is mounted upon the lower end of the fork, which point is fixed in relation to the steering wheel frame, but in this case the point of support does not constitute the center of the wheel for as illustrated the wheel is spring mounted and can be moved up and down relatively to the steering wheel frame; however, even this form of mounting is not absolutely necessary for it will be obvious that the support can be mounted upon a pivot which might move relatively to the steering wheel frame but not sufficiently to destroy the coöperation of the supporting frame with the points with which it engages. The lower ends of the side bars 10 are flared or inclined outwardly, their extreme lower ends forming relatively widely separated feet, and I connect them together by the cross bar 12. This bar is curved downwardly at its middle portion to provide clearance around the wheel. The lower end of the support is thus relatively light and I purposely make the yoke 13 which joins the upper ends of the side bars relatively heavy so that it will overbalance and automatically lift the lower end from the ground when the support is moved out of its supporting position.

I preferably secure the yoke to the upper end of the side bars so that the device can be adjusted to fit different makes of vehicles. I provide the upper ends of the side bars with holes 14 and I provide the yoke with several screw holes 15 adapted to receive screws to secure the side bars to the yoke. I preferably as described, form the side bars, particularly in the case of a bicycle support of very light channel bars and for the purpose of providing suitable bearings for the pivot I reinforce the middle portion of each bar with a channel shaped member 17 adapted to receive the side bar, securing the two parts together by rivets 18. I provide a rearwardly extending lug 19 formed on the reinforcing member 17 and projecting from the rear side thereof and in this lug I provide a smooth hole 20 for mounting the support. Preferably as shown in Fig. —6— I make the hole 20 larger than the axle 8 to receive a thimble 21 upon which the side bar can turn freely between the side of the steering wheel frame and the flange 22 of the securing nut 23. Preferably the thimble and securing nut are formed integrally as shown.

I provide the upper end of the support or yoke 13 and the frame of the vehicle with coöperating locking parts so that when the support is in a supporting position the steering wheel frame, and consequently the steering wheel are held in alinement with the main frame and locked against being rotated out of such position.

In Figs. —1—, —3—, —4— and —5— these coöperating locking parts consist of a rearwardly extending fork 24 on the yoke 13 and a forwardly extending tongue 25 secured rigidly to the main frame of the vehicle and preferably secured to the head 6 of the vehicle.

In Figs. —1—, —4— and —5— as shown, this tongue is formed integrally with the head 6, projecting forwardly and centrally therefrom and adapted to enter freely into the central space 26 between the prongs of the fork 24 when the steering frame is swung into alinement with the main frame. I provide registering openings 27 and 28 in the tongue 25 and fork 24 respectively adapted, when the stand is in a supporting position to receive the bail 29 of the lock 30 by means of which these two parts can be securely locked together, thus absolutely preventing the movement of the vehicle upon the wheel 7 in the ordinary or usual manner.

Instead of forming the tongue 25 integrally with the head 26 I sometimes form it on a separate member 31 see Fig. —3—, adapted to be bolted or clamped to the head 6 by means of clamping bolts 32, in a well known manner. But whether formed integrally or not, when once it is properly secured to the head, it forms a part rigid with the frame of the vehicle and adapted for coöperating with the locking part of the supporting frame for locking the steering gear.

As hereinbefore mentioned I prefer to make the yoke relatively heavy so that when free of the head of the vehicle frame it will overbalance the opposite end of the stand and rotate the stand upon its pivots to its non-supporting position shown in dotted lines in Figs. —1— and —7—.

The offset pivotal mounting of the supporting frame assists this automatic action in an obvious manner. To hold the supporting frame in its non-supporting position I preferably provide a spring tongue 33 secured to the lower end of the mud guard 9 and adapted to interlock with the cross bar 12 when the support is moved into its non-supporting position.

In applying my support to a motorcycle I prefer to change the relation of the interlocking parts on the yoke and the vehicle frame as shown in Figs. —7— and —8—. That is, I provide a pair of forwardly projecting lugs 34 rigid with the vehicle frame and spaced apart to receive the tongue 35 on the yoke of the supporting frame. The usual steering frame of the motorcycle is provided with strut rods 36 placed forwardly of the steering head and in order to let these rods swing far enough to properly steer the motorcycle I shorten the interlocking part which is rigid with the vehicle frame sufficiently to permit this movement. In so doing the point of interlockment is brought so close to the head that it is more convenient to provide a fork on the head of the vehicle and a tongue on the yoke as shown. But whether these interlocking parts are formed one way or the other they constitute a coöperating means for locking the steering gear when the stand is in a supporting position.

As shown in the drawings I form the frame so that its line of contact with the ground is slightly in advance of the steering wheel center so that the vehicle will be supported in stable condition and, as shown, I bend or form the upper part of the supporting frame rearwardly so as to bring it a suitable distance from the vehicle head for properly coöperating therewith.

In using my stand or support, the stand being in a supporting position, as shown in Figs. —1— and —7— the rider may mount into the saddle of the vehicle and by a forward movement of the body or by throwing in the clutch, if his engine is running, start the vehicle forward. The lower end of the stand remains stationary on the ground, and the front wheel rises as the supporting frame swings around on its pivot. The upper part of the supporting frame is carried out of engagement with the vehicle frame and the stand is now free to automatically swing to the position shown in Figs. —1— and —7— in dotted lines, in which position it is engaged by the retaining spring 33. When it is desired to support the vehicle upon the stand, the rider merely places his foot upon the rear end of the stand depressing it into contact with the ground and then by drawing the vehicle backward the front wheel is raised from the ground and the upper part of the support is swung into interlocking engagement with the frame of the vehicle. Thereafter the lock 30 can be readily placed in position to lock the support to the vehicle frame.

As many modifications of my invention will readily suggest themselves to one skilled in the art I do not confine or limit my invention to the specific structures herein shown and described.

I claim:—

1. A support for vehicles having a steering wheel, comprising a member adapted to be pivotally mounted on the steering frame of the vehicle adjacent to the center of the steering wheel and of a length to span the same, provided at its lower end with transversely separated feet and at its upper end with a part adapted to coöperate with a part rigid with the main frame of the vehicle, when the support is in supporting position to hold the steering frame against movement relatively to the main frame.

2. A support for vehicles having two wheels one in front of the other and one thereof being a steering wheel, said support comprising a supporting frame adapted to be pivotally mounted upon the steering frame and of a length to span the steering wheel, the lower end of the support, when it is in supporting position being adapted to project beyond the center of the steering wheel, and provided at its upper end with a locking part adapted to coöperate with a similar part rigid with the main frame to hold the steering wheel frame against movement relatively to the main frame, the upper end of the support being heavier than the lower end, whereby, when the lower part is swung within the center line of the steering wheel it automatically rises out of contact with the ground.

3. A support for a two wheeled vehicle, the front wheel being the steering wheel, comprising a frame adapted for pivotal support on the frame carrying the steering wheel adjacent to the axle of the wheel, and of a length to diametrically span the wheel, two relatively widely separated feet on the lower end of the support, a locking part on the upper end of the support adapted to coöperate with a similar part rigid with the main frame to hold the steering wheel frame against movement relative to the main frame when the support is in a supporting position.

4. A bicycle support for supporting the front wheel and locking the steering gear of the bicycle, comprising a frame arranged to extend substantially diametrically across the front wheel and over its periphery, said frame being pivotally mounted on the front wheel frame to swing around the wheel, and locking means upon said frame for engaging counterpart locking means on the bicycle frame when the supporting means is in a supporting position.

5. A support for a two wheeled vehicle adapted to be associated with the steering wheel thereof, and comprising a supporting frame pivotally mounted upon the lower end of the steering frame to swing substantially concentric with the steering wheel, provided at its lower end with transversely spaced feet adapted to contact with the ground, and at its upper end with a rearwardly projecting locking part adapted to coöperate with a similar locking part rigid with the main frame of the vehicle for holding the steering frame against movement relatively to the main frame when the support is in supporting position.

6. A support for a two wheeled vehicle adapted to be associated with the steering wheel thereof, and comprising a supporting frame adapted to be pivotally mounted upon the lower end of the steering wheel frame to swing substantially concentric with the steering wheel, provided at its lower end with transversely spaced feet adapted to contact with the ground, and at its upper end with a rearwardly projecting locking part adapted to coöperate with a similar locking part rigid with the main frame of the vehicle for holding the steering frame against movement relatively to the main frame when the support is in supporting position, and means for locking said coöperating parts together to prevent their separation.

7. A support for a two wheeled vehicle adapted to be associated with the steering wheel thereof, and comprising a supporting frame pivotally mounted upon the lower end of the steering frame to swing substantially concentric with the steering wheel, provided at its lower end with transversely spaced feet adapted to contact with the ground, and at its upper end with a rearwardly projecting locking part adapted to coöperate with a similar locking part rigid with the main frame of the vehicle for holding the steering frame against movement relatively to the main frame when the support is in supporting position, said coöperating parts being provided with openings adapted to register when the supporting frame is in a supporting position and adapted to receive a locking rod to prevent their separation.

8. A support for vehicles adapted to be pivotally mounted approximately at the center of the steering wheel and of a length to span the steering wheel, one end being heavier than the other and adapted to overbalance and raise the opposite end thereof from the ground and means for engagement with the frame of the vehicle to hold the support in its non-supporting position.

9. A support for vehicles adapted to be pivotally mounted approximately at the center of the steering wheel and of a length to span the wheel, the upper end being heavier than the lower end, and adapted when the support is free of the ground to automatically raise the lower end to its non-supporting position, and means for engaging the upper end of the support with the main frame of the vehicle and holding it against movement relatively to the main frame.

10. A vehicle support adapted to be pivotally mounted on the steering wheel frame at approximately the center of the steering wheel, one end thereof, when in supporting position, being adapted to contact with the ground and support the steering wheel free from the ground, the opposite end being of a weight to overbalance the lower end and raise it free from the ground when the support is moved to its non-supporting position.

11. The improvements herein described comprising a support for vehicles adapted to support the steering wheel free of the ground and comprising a frame adapted to be pivotally mounted upon the steering wheel frame to swing around the wheel, and of a length to span the wheel and provided with cross bars at its end adapted to extend across the periphery of the wheel.

12. The improvements herein described comprising a support for vehicles adapted to support the steering wheel thereof free of the ground and comprising a frame of a length to span the wheel and adapted to be pivotally mounted on the steering wheel frame to swing around the periphery of the wheel, and having one end adapted for interlockment with the frame of the vehicle to prevent relative movement of the steering wheel frame when the support is in supporting position.

13. A bicycle support for supporting the front wheel and locking the steering gear of a bicycle, comprising in combination, a frame arranged to extend upon opposite sides of the wheel and over its periphery, said frame being adapted to be pivoted upon the steering wheel frame adjacent to the center of the wheel, and locking means upon said frame for engaging rigid counterpart locking means upon the bicycle frame when said supporting frame is in position to support said bicycle.

14. A bicycle support, comprising in combination, a frame adapted to be pivotally mounted upon the axle of the steering wheel of a bicycle, said frame consisting of supporting means adapted when in supporting position to extend downwardly upon opposite sides of the wheel and over its top, and counterpart locking means upon said supporting frame and the bicycle frame respectively, in position to become engaged when said supporting frame is in a supporting position, to lock the steering gear against rotation.

15. A bicycle support, comprising, in combination, a frame pivotally mounted upon the axle of the forward wheel of a bicycle, said frame consisting of supporting means adapted when in a predetermined operative position to extend downwardly upon opposite sides of the wheel and over its top, locking means upon said supporting frame and counterpart locking means upon the bicycle frame for engagement therewith for locking the steering gear against rotation when said supporting frame is in a supporting position, and means for normally holding said supporting frame in a non-supporting and non-locking position.

16. A bicycle support, comprising, in combination, a frame pivotally mounted upon the axle of the forward wheel of a bicycle, said frame consisting of supporting members located upon opposite sides of the wheel, said members being connected at opposite ends, locking means upon one end of said frame for engaging counterpart locking means upon the bicycle frame for locking the steering-gear against rotation when the supporting frame is in a supporting position, and means for engaging said frame to normally hold it in a non-supporting position.

17. A bicycle support for supporting the front wheel of a bicycle and locking the steering-gear, comprising, in combination, a frame having rigidly connected supporting members located upon opposite sides of the wheel, said supporting members being pivoted between their ends upon the wheel axle, locking means upon said frame and rigid stationary counterpart means upon the bicycle frame for engagement therewith when said supporting frame is in a predetermined supporting position, and yielding means for normally holding said supporting frame in a non-supporting position.

18. A support for a bicycle, comprising an elongated frame adapted to be pivotally mounted on the steering frame of the bicycle to swing around the steering wheel thereof, the lower end wider than the upper end and adapted when in supporting position to hold the steering wheel free of the ground and the upper end adapted to project above the steering wheel and contact with the bicycle frame to limit the swinging movement of the support in one direction.

19. A bicycle in combination with a support comprising an elongated frame wider at one end than at the other, and long enough to diametrically span the steering wheel of the bicycle, said frame adapted to be pivotally mounted upon the steering frame thereof to swing around the wheel into and out of supporting position, the wide end adapted to contact with the ground when the support is in supporting position and hold the steering wheel free of the ground, and means for locking the steering frame against steering motion.

20. A bicycle in combination with a support comprising an elongated frame wide enough to receive the steering frame of the bicycle between its sides and long enough to diametrically span the steering wheel of the bicycle and adapted to be pivotally mounted on the steering frame to swing freely around the wheel, one end wider than the other and adapted to project below the steering wheel forward of the axis thereof and the other end adapted to contact with the main frame of the bicycle when the support is in supporting position.

21. A bicycle support comprising an elongated frame wide enough to receive the steering frame of a bicycle between its sides, long enough to diametrically span the steering wheel thereof and adapted to be pivotally mounted on the steering frame to swing freely around the wheel, one end wider than the other and adapted when in supporting position to project below the steering wheel, and the other end adapted at such time to contact with the main frame of the bicycle, and means for locking the steering frame against steering motion.

22. A vehicle having a steering wheel in combination with a wheel support pivotally mounted adjacent to the center of the steering wheel to swing around the wheel and adapted, when swung to supporting position, to hold the steering wheel clear of the ground, and means for locking the steering wheel against steering motion relatively to the frame of the vehicle.

23. A vehicle having a steering wheel in combination with a wheel support pivotally mounted adjacent to the center of the steering wheel to swing around the wheel and adapted, when swung to supporting position, to hold the steering wheel clear of the ground, said support being adapted when in supporting position to interlock with the frame of the vehicle and thus lock the steering wheel against steering motion.

In testimony whereof, I have hereunto set my hand this 25th day of September, 1915, in the presence of one subscribing witness.

AUGUST D. MEISELBACH.

Witness:
EDWARD FAY WILSON.

Copies of this patent may be obtained for five cents each, by addressing the "Commissioner of Patents, Washington, D. C."